United States Patent Office 3,809,656
Patented May 7, 1974

3,809,656
EUTECTIC MIXTURE OF PARA-ALKOXYBENZYL-IDENE PARA-N-ALKYL ANILINES
Elwood L. Strebel, Cincinnati, Ohio, assignor to Vari-Light Corporation, Cincinnati, Ohio
No Drawing. Original application Apr. 17, 1969, Ser. No. 817,143, now abandoned. Divided and this application May 10, 1973, Ser. No. 358,838
Int. Cl. C09k 3/00; C07c 119/00
U.S. Cl. 252—408                           4 Claims

ABSTRACT OF THE DISCLOSURE

A new family of organic thermotropic nematic compounds comprising para-substituted alkoxy benzylidene-anilines having also para-alkyl substituents on the aniline ring. These compounds have the following structural formula:

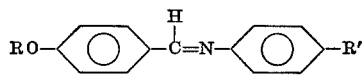

wherein

R is a straight or branched chain alkyl group containing 1 to 8 C atoms; and
R' is a straight chain alkyl group containing 2 to 8 C atoms.

Synthesis involves combining the desired substituted benzaldehyde and substituted aniline in equimolar proportions in anhydrous ethyl alcohol with glacial acetic acid as catalyst. The resulting homologous series of compounds are useful as optically active (i.e. birefringent) materials which have a mesomorphic phase ranging from about 0° to about 70° C., low viscosity at the nematic range, good heat stability, and substantially no color.

---

This is a division of application Ser. No. 817,143 filed Apr. 17, 1969, now abandoned.

BACKGROUND OF THE INVENTION

This invention relates to compounds which have an optically active nematic liquid crystalline phase, or a mesomorphic phase as it is often called. Materials having a mesomorphic phase do not pass directly from the solid state to the liquid state upon being heated, but rather have an intermediate state in which the material is neither a true solid or a true liquid. Such materials are generally referred to as liquid crystals. Materials having a mesomorphic phase also may be caused to go into this phase by solution in an appropriate solvent, or in other ways as hereinafter described. The nematic materials have the useful property of high light dispersion when under the influence of an electric potential or a strong magnetic field.

There are several mesomorphic phases or forms, namely, the nematic, smectic and cholesteric mesophases. The term "nematic" means "thread-like" and is applied to those materials which, when in their mesomorphic stage, assume a characteristic thread-like texture in which the molecules or aggregates thereof are parallel and have one axis pointed in the same direction. This is the lowest degree of order of molecular arrangement of the several mesomorphic phases, the smectic phase being of the next higher order of molecular arrangement. The cholesteric mesophase is a special case of the nematic phase. As a class these materials are characterized by birefringence.

The present invention is concerned with a new family of thermotropic nematic compounds. While there are numerous known thermotropic nematic compounds, such as 4,4'-di-n-heptoxyazoxybenzene, p-azoxy anisole, and anisylidene p-aminophenylacetate, these materials as a group have the drawback that their nematic mesophase occurs at temperatures well above room temperature. At a result their utility is limited to applications within their elevated temperature range. Moreover, such compounds have relatively high viscosities when in the nematic range and may have sufficient color to mask the optical activity. In addition, many of the known nematic compounds are expensive to produce and difficult to synthesize.

SUMMARY OF THE INVENTION

The present invention relates to a new family of thermotropic nematic compounds, preferred members of which exhibit a mesomorphic phase within a temperature range of from about 0° to about 85° C. Certain of the compounds having a mesomorphic phase at somewhat elevated temperature ranges form eutectic mixtures with other compounds of the family which mixtures exhibit a mesomorphic phase at a lower temperature range, i.e., substantially below the temperature range of either compound in the pure state. The compounds additionally have low viscosity at the nematic range with consequent rapid response and are nearly colorless. These compounds are also simple to produce utilizing relatively inexpensive starting materials.

Compounds in accordance with the invention will find widespread usage in a variety of applications wherein it is desired to convert electronic information into visual form or to effect a visual display, inclusive of optical display devices, light valves, and similar applications involving the modulation of light in accordance with the applied energy. Heat is a principal medium for inducing the compounds to enter their mesomorphic phase. Other forms of energy may be utilized to effect the optical character; these include electrical fields, magnetism, and ultrasonic vibrations. Even mechanical stresses may be employed to induce varying effects. Polarized light or a polarized analyzer may be used for viewing the optical activity.

DESCRIPTION OF THE PREFERRED EMBODIMENTS

Homologous compounds representative of the structural formula and having the above described properties include:

p-methoxybenzylidene-p'-ethyl aniline
p-methoxybenzylidene-p'-butyl aniline
p-ethoxybenzylidene-p'-butyl aniline
p-butoxybenzylidene-p'-butyl aniline
p-butoxybenzylidene-p'-ethyl aniline
p-pentoxybenzylidene-p'-ethyl aniline
p-ethoxybenzylidene-p'-octyl aniline
p-heptoxybenzylidene-p'-ethyl aniline The lowest homologue of the series has the following structural formula:

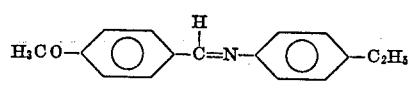

The highest homologue of the series has the following structural formula:

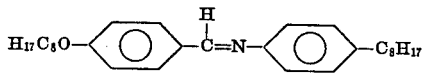

It will be apparent that a multiplicity of compounds having intermediate chain lengths of R and R', in either directly or oppositely ascending order, fall within the scope of the invention. Thus, R could have a value of 2 and R' of 8; or R could have a value of 8 and R' of 2; with all possible variations therebetween.

The compounds of the present invention can be synthesized from relatively simple and inexpensive raw materials by conventional reactions, or from commercially available intermediate compounds, such as para-alkoxybenzaldehydes and para-alkyl anilines. Alternatively, eutectic mixtures could be synthesized by utilizing mixtures of intermediate compounds wherein the alkoxy and alkyl substituents range from, e.g., 2 to 8 carbon atoms. It will be evident that such reaction products would comprise eutectic mixtures of all homologues within that range.

The alkoxybenzaldehyde is reacted with the para-substituted aniline in stoichiometric quantities in 20-30 parts of anhydrous ethanol, using about 0.1% glacial acetic acid as a catalyst. The mixture is refluxed for a short period of time during which about ⅔ of the solvent is removed. The residual solution is cooled in an ice-bath, resulting in precipitation of the reaction product. This precipitate is then filtered and purified by recrystallization from ethanol two or more times.

If the reaction product remains liquid at the temperature of the ice bath, purification is effected by vacuum distillation.

The reaction is represented by the following equation:

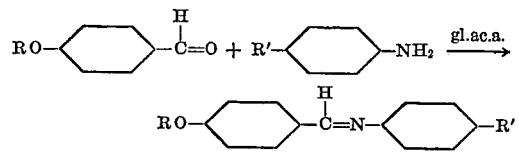

The melting points and nematic ranges of representative compounds of the instant invention are set forth in Table I below.

TABLE I

| Example | | Melting point, °C. | Nematic range, °C |
|---|---|---|---|
| 1 | p-Methoxybenzylidene-p'-n-butyl aniline, or (anisylidene-p-aminophenyl)n-butane. | ~10 | To 47. |
| 2 | p-Ethoxybenzylidene-p'-n-butyl aniline | 34 | To 68. |
| 3 | p-n-Propoxybenzylidene-p'-n-butyl aniline | 32 | To 56. |
| 4 | p-n-Butoxybenzylidene-p'-ethyl aniline | 47 | To 56. |
| 5 | p-n-Butoxybenzylidene-p'-n-butyl aniline | 32 | To 55. |
| 6 | p-i-Pentoxybenzylidene-p'-n-butyl aniline | (¹) | (²) |
| 7 | p-i-Butoxybenzylidene-p'-n-butyl aniline | (¹) | (²) |
| 8 | p-n-Pentoxybenzylidene-p'-n-butyl aniline | 50 | To 61. |
| 9 | p-n-Hexoxybenzylidene-p'-n-butyl aniline | 64 | To 71. |
| 10 | p-n-Heptoxybenzylidene-p'-ethyl aniline | 52 | To 58. |

¹ Liquid at room temperature.
² Nematic on cooling.

The nematic ranges of eutectic mixtures of representative compounds are set forth in Table II below.

Eutectic mixtures can be utilized to obtain nematic ranges as broad as from about 0° to 70° C., thereby providing utility over a wide variety of applications and conditions.

TABLE II

| Eutectic mixture | | Nematic range of pure compound, °C. | Nematic range of eutectic mixture, °C. |
|---|---|---|---|
| A | Example 3 | 32-56 | 10-68 |
|   | Example 2 | 34-68 | |
| B | Example 1 | ~10-47 | 0-63 |
|   | Example 2 | 34-68 | |

Viscosity measurements were not made, but the viscosities of the examples of Table I above when in the nematic range were observed to be slightly above the viscosity of water.

All the compounds of Table I were substantially colorless, and this class of compounds characteristically exhibits good stability when subjected to heat and good stability to ultraviolet light.

The following compound, falling outside the definition of the novel compounds of the present invention, was found to be unsuitable for the purposes of the present invention: p-ethoxybenzylidene-p'-methyl aniline.

In summary, the present invention provides a novel series of compounds useful as optically active material having a nematic mesomorphic phase ranging between about 0° and 70° C., which compounds are characterized by low viscosity when within the nematic range, substantial lack of color, good stability to heat and ultraviolet light, and relatively low cost. Moreover, the nematic range of certain of the members of the group of compounds can be extended downwardly by forming eutectic mixtures.

While the invention has been described in language more or less specific as to preferred embodiments, it is to be understood that the invention is not so limited but is to be construed as covering, e.g., modifications wherein the compounds herein disclosed are mixed with other components of known type, thereby obtaining modified properties without sacrificing any of the advantages of the invention.

The embodiments of the invention in which an exclusive property or privilege is claimed are defined as follows:

1. An eutectic mixture of p-alkoxybenzylidene-p'-n-alkyl anilines exhibiting a nematic mesomorphic phase between about 0° and about 70° C., wherein the alkyl radicals are straight chain groups containing 2 to 8 carbon atoms, and the alkoxy radicals are straight or branched chain groups containing 1 to 8 carbon atoms.

2. A mixture of p-methoxybenzylidene-p'-n-butyl aniline and p-ethoxybenzylidene-p'-n-butyl aniline.

3. A mixture of p-ethoxybenzylidene-p'-n-butyl aniline and p-n-propoxybenzylidene-p'-n-butyl aniline.

4. A binary mixture of p-alkoxybenzylidene-p'-n-butyl anilines exhibiting a nematic mesomorphic phase between about 0° and 70° C., wherein the alkoxy radicals are straight or branched chain groups containing 1 to 4 carbon atoms.

References Cited

FOREIGN PATENTS 2,017,727   4/1970   Germany _____ 252—408

OTHER REFERENCES

Keasling et al., Chem. Abs., vol. 44, col. 3927(d) (1950).

Nagy, Chem. Abs., vol. 69, col. 43200g (1968).

Tetrahedron, vol. 23, p. 3657 (1967).

LELAND A. SEBASTIAN, Primary Examiner

U.S. Cl. X.R.

260—566 F